United States Patent
Santo

(10) Patent No.: US 7,790,235 B2
(45) Date of Patent: Sep. 7, 2010

(54) COMPOSITE PRESSURE CONTAINER OR TUBULAR BODY AND COMPOSITE INTERMEDIATE

(75) Inventor: Ietsugu Santo, Toyohashi (JP)

(73) Assignee: Mitsubishi Rayon Company, Ltd., Toyohashi (JP)

( * ) Notice: Subject to any disclaimer, the term of this patent is extended or adjusted under 35 U.S.C. 154(b) by 222 days.

(21) Appl. No.: 11/485,977

(22) Filed: Jul. 14, 2006

(65) Prior Publication Data

US 2006/0257576 A1    Nov. 16, 2006

Related U.S. Application Data

(62) Division of application No. 10/244,749, filed on Sep. 17, 2002, now abandoned.

(51) Int. Cl.
*B05D 3/02* (2006.01)

(52) U.S. Cl. ............... 427/385.5; 427/386; 427/389.8; 427/389.9; 427/394

(58) Field of Classification Search .............. 427/121, 427/385.5, 386, 389.9
See application file for complete search history.

(56) References Cited

U.S. PATENT DOCUMENTS

| | | | |
|---|---|---|---|
| 4,252,592 A | 2/1981 | Green | |
| 4,835,975 A | 6/1989 | Windecker | |
| 4,886,356 A | 12/1989 | Paradis | |
| 5,334,419 A * | 8/1994 | Minami et al. | 427/386 |
| 5,356,499 A | 10/1994 | Decker et al. | |
| 5,459,180 A | 10/1995 | Pfeil et al. | |
| 5,545,278 A | 8/1996 | Chen et al. | |
| 5,589,523 A | 12/1996 | Sawaoka et al. | |
| 5,591,784 A | 1/1997 | Muranaka | |
| 6,515,081 B2 | 2/2003 | Oosedo et al. | |
| 6,670,006 B1 | 12/2003 | Sugimori et al. | |
| 6,730,729 B2 | 5/2004 | Gerst et al. | |
| 2002/0108699 A1 | 8/2002 | Cofer et al. | |

FOREIGN PATENT DOCUMENTS

| | | |
|---|---|---|
| GB | 1 544 249 | 4/1979 |
| JP | 51-148767 | 12/1976 |
| JP | 03-168167 | 7/1991 |
| JP | 03-193436 | 8/1991 |
| JP | 04-214739 | 8/1992 |
| JP | 05-247323 | 9/1993 |
| JP | 06-212057 | 8/1994 |
| JP | 06-287272 | 10/1994 |
| JP | 07-080973 | 3/1995 |
| JP | 07-137163 | 5/1995 |
| JP | 08-104757 | 4/1996 |
| JP | 09-003777 | 1/1997 |
| JP | 09-085844 | 3/1997 |
| JP | 09-194712 | 7/1997 |

(Continued)

*Primary Examiner*—Erma Cameron
(74) *Attorney, Agent, or Firm*—Oblon, Spivak, McClelland, Maier & Neustadt, L.L.P.

(57) ABSTRACT

One embodiment of the present invention relates to a composite pressure container or tubular body, which includes:
  a prepreg tow winding obtained by a process that includes:
    contacting at least one fiber with an uncured thermosetting resin, to form a coated fiber;
    winding said coated fiber around an outer shell, form, liner, or mandrel; and
    curing the resin;
  wherein said uncured thermosetting resin includes at least one surface active oligomer or polymer.

35 Claims, 1 Drawing Sheet

Process for Production of Prepreg Tow

FOREIGN PATENT DOCUMENTS

| | | |
|---|---|---|
| JP | 10-114024 | 5/1998 |
| JP | 10-114026 | 5/1998 |
| JP | 2001-253952 | 9/1998 |
| JP | 11-035863 | 2/1999 |
| JP | 11-130882 | 5/1999 |
| JP | 2994447 | 10/1999 |
| JP | 2000-214060 | 8/2000 |
| JP | 2000-220302 | 8/2000 |
| JP | 2001-258430 | 9/2001 |
| JP | 2001-354788 | 12/2001 |
| JP | 2003-268137 | 9/2003 |
| WO | WO00/24008 | * 4/2000 |

* cited by examiner

Fig. 1 Process for Production of Prepreg Tow
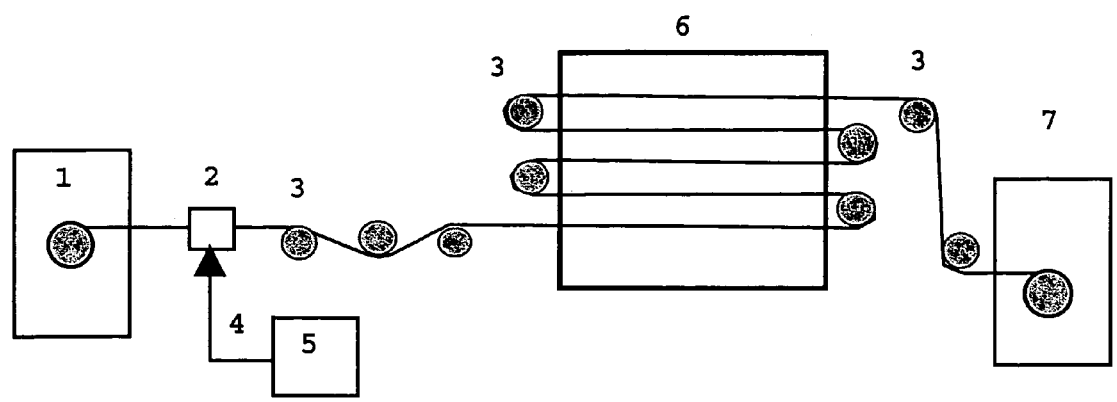

COMPOSITE PRESSURE CONTAINER OR TUBULAR BODY AND COMPOSITE INTERMEDIATE

BACKGROUND OF THE INVENTION

1. Field of the Invention

The present invention relates to a composite pressure container, tubular body and/or composite intermediate produced using a prepreg tow process, reinforced fibers and prepreg tows for use in same, and methods of making and using same.

2. Discussion of the Background

In recent years, composite molded articles have been increasingly used in applications such as CNG (compressed natural gas) tanks, breather oxygen tanks, e.g., for firefighters, hydrogen storage tanks, e.g., for fuel cells, off-shore pipes and flywheel rotors. These articles are generally produced by the filament winding method The filament winding method is suitable for the production of cylindrical or spherical molded articles, and it is quite advantageous because it facilitates automated manufacturing processes. This method also allows great reduction in the weight of the article, e.g., by replacing ordinary metals with a composite.

Generally, in the filament winding method, a reinforcing fiber is dipped in an impregnation bath containing a low-viscosity resin, and, after removal of the excess resin, is wound on a mandrel or a form to produce a pressure container or a tubular body.

For pressure containers, in order not to leak the stored compressed liquid or gas, a plastic or metal liner is used, and the reinforcing fiber is wound around the liner outer shell to enhance the strength of the liner.

In a "wet" filament winding method, a reinforcing fiber that is not impregnated with resin is impregnated with resin formed in situ, to form a reinforcing fiber. The reinforcing fiber is then wound on a mandrel such as the above-mentioned liner. The wet filament winding method is still used as a mainstream process.

Epoxy resin is mainly used as the resin in filament winding. To facilitate impregnation, low-viscosity resin is generally used. In the wet filament winding method, the resin composition, curing agent or catalyst are generally selected so that the curing reaction proceeds gradually at room temperature.

The above-mentioned resins are good for the production of small molded articles. However, when producing large composite structures, for example, it takes a long time to complete the winding, and thus the use of the resins wherein the curing reaction proceeds at room temperature is a problem. To solve this problem, the so-called "prepreg tow" is sometimes used.

In a prepreg tow, a latent curing agent or a resin composition having a latent curing property is generally selected, and it is stored at a low temperature or room temperature. Because of the latent curing property, the curing reaction proceeds very slowly, and thickening of the resin does not occur even if the winding is carried out at room temperature. In addition, since the prepreg tow resin generally has a relatively high viscosity when compared to wet method resins, the prepreg tow resin adheres less to a roll or to a guide. Even if the prepreg tow resin does adhere to the roll or guide, however, resin thickening does not occur, as noted above. Therefore, the requirement for solvents or solvent resin removal is desirably minimized. Thus, large molded articles can easily be produced with great effect.

Pressure containers have attracted much interest because they are particularly suitable for storing and/or preserving an energy source that replaces gasoline. These pressure containers have heretofore been produced with metallic materials, which are heavy. When metallic pressure containers are used in automobiles, operating costs are high, and payload must be limited. It has been found that the use of composite pressure containers can realize a high burst pressure with light weight, and thus an all composite or partial composite pressure container has come to be used.

Continuous attempts have been made to minimize the weight in pressure containers, and one of the most important requirements is to maximize fiber strength translation of the particular reinforcing fiber used but minimize the amount of material required.

One of the problems heretofore associated with the production of composite pressure containers is that the substantial tensile strength (as hoop strength) of a pressure container decreases relative to the reinforcing fiber tensile strength (strand tensile strength). A general performance standard of a composite container is to exhibit a fiber strength (fiber strength translation) from the reinforcing fiber strength to the hoop fiber tensile strength in the composite pressure container. The fiber strength translation directly influences the design weight strength and the material cost of a pressure container. When the fiber strength translation is increased by even several percentages, it is quite advantageous in view of the cost. For this reason, it is extremely important to increase the hoop fiber tensile strength of a composite pressure container.

U.S. Pat. No. 5,356,499 reports that the burst pressure of a hoop fiber of a pressure container that is reinforced with a reinforcing fiber or the fiber strength translation of a reinforcing fiber calculated therefrom is improved by adding an appropriate amount of a surface active agent to the resin composition whose viscosity has been chemically adjusted in advance. According to the patent, the use of a surface active agent markedly increases the fiber strength translation in comparison with the absence of the surface active agent, and further its coefficient of variation (CV) of the burst pressure is minimized by the use of an appropriate amount of the surface active agent, especially the use of a prepreg tow. In this technique, the combination of a room temperature curing agent and a latent curing agent, appropriate adjustment of resin viscosity with a room temperature curing agent, and a surface active agent in an amount of less than approximately 1% contribute toward improving the fiber strength translation of a composite pressure container. The level of the fiber strength translation, however, is at most 90%, and there is room for further improvement.

SUMMARY OF THE INVENTION

Accordingly, one object of the present invention is to solve the aforementioned problems.

Another object of the present invention is to provide a composite pressure container or tubular body using a prepreg tow in which the fiber strength translation of a hoop fiber is improved.

Another object of the present invention is to provide a composite pressure container or tubular body using a prepreg tow, which can be produced in an ecologically friendly manner.

These and other objects have been achieved by the present invention, the first embodiment of which provides a composite pressure container or tubular body, which includes:

a prepreg tow winding obtained by a process that includes:

contacting at least one fiber with an uncured thermosetting resin, to form a coated fiber;

winding said coated fiber around an outer shell, form, liner, or mandrel; and curing the resin;

wherein said uncured thermosetting resin includes at least one surface active oligomer or polymer.

Another embodiment of the invention provides a process for producing a prepreg tow and/or a prepreg, which includes:

contacting at least one reinforcing fiber with:
a thermosetting resin, and
a solution or an aqueous emulsion that includes water, to form a coated fiber; and
vaporizing the water from the coated fiber.

Another embodiment of the invention provides a process for producing a prepreg tow and/or a prepreg, which includes:

producing at least one reinforcing fiber;
contacting the reinforcing fiber with:
a thermosetting resin, and
a solution or an aqueous emulsion comprising water, to form a coated fiber; and
vaporizing the water from the coated fiber.

Another embodiment of the invention provides a prepreg or prepreg tow, which includes at least one fiber, at least one thermosetting resin, and at least one surface active oligomer or polymer.

Another embodiment of the invention provides a reinforced fiber, which includes a fiber, at least one thermosetting resin, and at least one surface active oligomer or polymer.

Another embodiment of the invention provides a pressure container or tubular body, which includes the above reinforced fiber in contact with an inner shell or liner.

By the present invention, an ecologically friendly process is possible, and the fiber strength translation of a hoop fiber in a composite pressure container or tubular body is greatly improved.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein FIG. 1 is a schematic view showing a preferred process for producing of a prepreg tow.

DESCRIPTION OF REFERENCE NUMERALS 1. creel
2. resin addition device
3. impregnation roller
4. resin feed pipe
5. resin tank
6. oven
7. winder.

DESCRIPTION OF THE PREFERRED EMBODIMENTS

Various other objects, features and attendant advantages of the present invention will be more fully appreciated as the same becomes better understood from the following detailed description of the preferred embodiments of the invention.

The present invention relates to a pressure container or a tubular body in which a reinforcing fiber wound on a pressure container or a tubular body in a hoop layer or layers exhibits a tensile strength as a hoop strength at a high achievement rate (high fiber strength translation) relative to a delivered reinforcing fiber tensile strength. More specifically, the invention relates to a resin, a surface active additive, a composite strength, an uncured resin viscosity, a resin content and its composite intermediate which are most appropriate for improving, when producing a composite pressure container or tubular body using a prepreg tow, a strength of the composite container or tubular body, substantially a fiber strength translation inside the composite pressure container or tubular body.

Until the present invention, prepreg tows have been formed by a method in which the viscosity of a thermosetting resin is decreased using an organic solvent; a reinforcing fiber is impregnated with the thermosetting resin; and the solvent is then volatilized and dried. In view of solvent regulation associated with environmental problems in recent years, high cost of solvent recovery and solvent recovery devices, and fear of defective composite products caused by residual solvents, solventless methods have been used.

In the present invention, a surface active polymer or oligomer is used, and water is used as a diluent.

In the preferred process for producing a prepreg tow as shown in FIG. 1, a resin solution containing a surface active polymer or oligomer is charged into a resin tank 5, and fed to a reinforcing fiber bundle with a metering pump. After the fiber is fully impregnated with the resin solution using a resin impregnation roll 3, water is volatilized with an oven 6.

The water content of the resin aqueous solution or emulsion here is preferably 90% or less, based on the weight of the solution or emulsion. It is more preferably 50% or less, more particularly preferably 40% or less, more especially preferably 30% or less, and most preferably, 20% or less, based on the weight of the solution or emulsion. These ranges include all values and subranges there between, including 89, 80, 75, 61, 60, 59, 55, 51, 47, 45, 42, 38, 35, 25, 18, 15, 10, 9, 5 and 2%.

The viscosity of the emulsion with which the fiber is contacted or impregnated is preferably 1 to 10,000 cps. More preferably, the viscosity is 10 to 1,000 cps, more particularly preferably, 50 to 100 cps. These ranges include all values and subranges there between, including 2, 15, 25, 75, 200, 500, 750, 1,500, 5,000, 7,500, and 9,000 cps.

In controlling the amount of the resin in the reinforcing fiber, it is preferable to use a metering pump in each weight. The resin may also be distributed in each weight by controlling with a shim or a needle valve. Feedback controlling via a shim or a needle valve with in-line detection of resin content is also preferable. The simplest and preferred method uses a gear pump. Combinations of metering and controlling methods are possible.

In the conventional method for controlling the amount of resin, the resin is excessively adhered, and the excess resin is then squeezed out. In comparison with this method, the constant feed method makes it easy to control the amount of resin fed to each weight, and it further dispenses with a squeezing-out step, and this can reduce the possibility of damaging the fiber and increase the production rate and is therefore preferred.

In resin impregnation, it is especially preferable that the constantly fed resin adheres to the fiber bundle continuously to start impregnation. A device for contacting and impregnating the resin is preferably one in which the resin is continuously fed, and the flowing resin is preferably one in which the resin can be continuously be fed and in which the flowing resin makes efficient contact with the reinforcing fiber bundle and particularly at the start of impregnation.

Reinforcing fiber is comprised of many filaments. "Impregnation" preferably means the respective surfaces of all or substantially all the filaments is wet with resin or resin emulsion. Before impregnation, the reinforcing fiber surface is facing the air or surrounded by air. The air is believed to be replaced with uncured resin or resin emulsion by capillary effect or resin flow through the bundle of filaments. The filament surface(s) is in contact with resin after impregnation.

In the case of resin emulsion, the water molecules vaporize during heating and finally only or substantially only the resin (containing small quantity of water volatile) is in contact with filament surface.

In the resin tank, it is preferable that the surface active polymer or oligomer is stirred and more preferably constantly stirred without agglomeration.

As a drying method with an oven, any method will do, but it is more preferable that the temperature can be fully controlled. A method in which temperature-controlled air, unreactive gas or reactive gas flows countercurrently with the fiber feed direction is preferable as the easiest and surest method.

Drying time is not particularly limited. The total exposing time at elevated temperature is preferably controlled such that the volatile content (and most preferably water content) should be less than 2% and more preferably less than 1%. Drying temperatures of preferably 100-200° C. (212-392° F.), more preferably 100-120° C. (212-250° F.) are used, which ranges include all values and subranges therebetween, including 105, 110, 115, 125, 130, 140, 150, 160, 170, 180, 190 and 195° C.

As the reinforcing fiber suited for the composite pressure container or tubular body, various fibers are available, and they are not particularly limited. The fibers can selectively be used according to the usage and properties required. A mixture of fibers is also possible.

As the reinforcing fiber, a glass fiber is suitable as it is a general reinforcing fiber, historically. However, carbon fiber, boron fiber, aramid fiber, polyester, polyethylene, nylon (polyamide), polypropylene, E-glass, S-glass, carbon graphite, and organic polymer fiber called PBO (polyphenylene benzo-bis-oxazole) fiber are also suitable. Combinations of fibers are possible.

In the wet method, a combination of low-viscosity epoxy resin and liquid amine curing agent, acid anhydride curing agent, imidazole curing agent or catalyst is preferred. The preferred resin component of the prepreg tow is described below.

Preferable examples of the resin, which exhibits a thermosetting property, include epoxy resin, unsaturated polyester, vinyl ester, bismaleimidetriazine, cyanate ester, benzoxazine and bismaleimide. Combinations of resins are possible. Epoxy resin is most preferable in view of the chemical resistance and cost.

It is preferable that the epoxy resin is selected from the group including a reaction product of epichlorohydrin and a compound containing at least one hydroxyl group, epoxidized cresol novolak, epoxidized phenol novolak, a reaction product of an aromatic hydroxyl compound and glyoxal, glycidylaniline, glycidylaniline derivative and bisphenol A novolak derivative. Combinations are possible.

More specifically, it is preferable that the epoxy resin is selected from the group including 4,4'-(isopropylidenediphenol), isopropylidenediphenolbis(2,6-dibromophenol), an epoxidized cresol novolak formed by glycidylating a cresol condensate resulting from resination of cresol with an acid catalyst, bisphenol A novolak, a tetraglycidyl ether of a tetrakis(4-hydroxyphenyl)ethane resin, 4,4'-methylenebis(N, N-glycidylaniline) and N,N-diglycidylaniline. Mixtures are possible.

As the curing agent for curing the epoxy resin, it is preferable to use an aromatic amine curing agent selected from the group including diaminediphenylsulfone, diaminodiphenylmethane, phenylenediamine and isomers thereof, a curing agent selected from the group including an aliphatic amine curing agent, an aromatic amine curing agent, an acid anhydride curing agent, a phenol curing acid and a Lewis acid or a curing agent selected from the group including dicyandiamide, ethylenediamine, diethylenetriamine, triethylenetetramine and hexamethylenediamine. Diaminodiphenylsulfone and dicyandiamide are especially preferable as a curing agent. Combinations are possible. Other curing agents may optionally and preferably be incorporated as appropriate to adjust the shelf life of the prepreg tow.

It is especially preferable that the catalyst of the epoxy resin is selected from the group including a tertiary amine, a Lewis acid, a urea compound and an imidazole. Combinations are possible. Specifically, it is more preferably selected from the group including benzyldimethylamine, pyridine, triethylamine, tetramethylbutanediamine, 2-methylimidazole, 2-ethyhnethylimidazole, BF3MEA, phenyldimethylurea, 3-phenyl-1,1-dimethylurea, 1,1'-4-(methyl-m-phenylene)bis(3,3'-dimethy)urea, 3-(3,4-dichlorophenyl)-1,1-dimethylurea, 4-diamino-6-(2'-dimethylimidazolyl-(1')), 2,4-diamino-6-(2'-methylimidazolyl-(1'))ethyl-S-triazine, 1-benzyl-2-methylimidazole and 2-heptadecylimidazole. They may also be used in combination.

Regarding the surface active oligomer or polymer, since the resin, and preferably the epoxy resin, is generally undissolved in water, it is preferably dispersed in water through the surface active oligomer or polymer. An affinity of the surface active oligomer or polymer for the epoxy resin and water is therefore preferably taken into account.

Many surface active agents are available. For the prepreg tow using the epoxy resin in the composite pressure container or tubular body in particular, an appropriate molecular weight is preferably taken into account.

The molecular weight of the surface active agent oligomer or polymer is preferably at least 5,000 and at most 30,000. When the molecular weight is less than 5,000, it is difficult to obtain a stable thermosetting resin emulsion. When the molecular weight exceeds 30,000, it is difficult to mix the resin. More preferably, the molecular weight of the surface active agent is from 5,500 to 25,000, more particularly preferably from 7,500 to 20,000, more especially preferably from 10,000 to 17,500, and most preferably from 12,000 to 15,000.

Unless otherwise specified, the term, "molecular weight" used herein means number average molecular weight.

It is preferable that the surface active oligomer or polymer has one or more hydrophilic atoms or hydrophilic groups in its main chain or side chain. Preferable examples of hydrophilic atoms or groups include oxygen, nitrogen, amino group, nitro group, sulfonic acid, sulfonate, hydroxy, sulfonyl, carboxylate, carboxylic acid, phosphonate, phosphate, ester, ether, and the like. Combinations are possible. One or more oxygen atoms in the main chain is most preferred. It is preferable that, in the repeating unit of the surface active oligomer or polymer, at least $1/10$ of atoms relative to the other atoms in the main chain are oxygen atoms. More preferably, at least $2/10$ are oxygen atoms, more particularly preferably at least $4/10$, and most preferably $6/10$.

Homopolymers and copolymers are suitable for the surface active oligomer or polymer. Block copolymers, random or statistical copolymers, and graft copolymers are preferable.

It is preferable that part or all of the surface active oligomer or polymer has an affinity for the epoxy resin used. In one method, by introducing an epoxy skeleton, for example, a bisphenol-A skeleton into the main chain, the compatibility with an epoxy resin other than the surface active oligomer or polymer can be increased. In this case, it is preferable that the molecular weight of an epoxy skeleton is 300 or more, more preferably 500 or more, and most preferably 700 or more.

Preferably, the surface active oligomer or polymer is a reaction product of polyethylene glycol or polypropylene glycol and an epoxy resin.

A preferred example of the surface active oligomer or polymer may be formed by reacting 2 mols of polyethylene glycol with 1 mol of a bisphenol-A epoxy resin which is 468 g/mol per epoxy equivalent.

The content of the surface active oligomer or polymer is preferably at least 1 and at most 10%, more preferably at least 2% and at most 10% based on the resin solid content. These ranges include all values and subranges therebetween, including 1.5, 2.5, 3, 4, 4.5, 5, 5.5, 6, 6.5, 7, 7.5, 8, 8.5, 9, and 9.5% based on the resin solid content. When the content of the surface active oligomer or polymer is less than 1%, the surface active effect is low which has an adverse effect on a stability of an emulsion. Further, when it is more than 10%, water is easily absorbed to decrease a heat resistance.

It is preferable that the curing agent, catalyst or curing accelerator is a powder at room temperature.

The particle diameter of the powder is preferably 20 μm or less, more preferably 10 μm or less. When the particle diameter is more than 20 μm, a stability in an emulsion or a slurry is poor and precipitation tends to occur. These ranges include all values and subranges therebetween, including 18, 16, 14, 12, 8, 6, 4, 2 and 1 μm or less.

The following mechanical characteristics for the prepreg tow in the composite pressure container are preferred for exhibiting a high fiber strength translation.

It is preferred that the interlaminar shear strength or SBS (short beam shear) in evaluating a unidirectionally oriented laminate according to ASTM D 2344 (incorporated herein by reference) is at least 8 Ksi and at most 18 Ksi, and the flexural strength in a 90° direction (FS90) evaluated according to ASTM D 790 (incorporated herein by reference) is at least 8 Ksi and at most 22 Ksi.

Ksi is a unit for pressure. Ksi is an abbreviation of kilopound (LB) per square inch. 1 Ksi means 6.89 MPa.

When the SBS (Short Beam Shear) is higher than 18 Ksi or the FS90 is higher than 22 Ksi, the adhesion between the reinforcing fiber and the resin is very strong, and the tensile strength is less exhibited. In order to obtain higher tensile strength of composite, the composite should have optimum adhesion between filament and resin. If composite has a strong adhesion between filament and resin, local filament failure may tend to cause catastrophic failure to transverse (90°) direction at a relatively lower stress level. If the adhesion is optimum, the initial failure may stop locally and also optimum adhesion may help appropriate stress transfer from filament to filament. One the other hand weak adhesion may cause low stress transfer between filaments and the stress imbalance between filaments may be extreme. It may cause a lower tensile strength. There must be an optimum range of adhesion. Specifically, Short Beam Shear (SBS) and 90° flexure are not direct criteria for adhesion but they are strongly related to adhesion properties and finally to tensile strength translation.

"Hoop state" or "hoop layer" means a layer or layers where prepreg tow is wound in the circumferential direction to form a tubular or cylindrical shape. In order to wind the prepreg tow closely on the whole surface of tubular body without cutting the prepreg tow, a small winding angle relative to the circumferential direction is needed and it is up to the width of prepreg tow. Accurately winding angle is not perpendicular to circumferential direction. This is called a hoop layer. After winding the first hoop layer, the second hoop layer may be wound with an opposite winding angle atop the first layer. Several hoop layers may be added as appropriate. "Hoop state" is a generic naming of a hoop layer or some hoop layers. Wound prepreg tow layers are cured or hardened to utilize as a composite article. Cured composite of pressure containers or tubular body may be tested in burst strength by applying inner pressure in pressure containers or tubular body.

For pressure containers, additional helical layers may be needed, wherein the prepreg tow is placed with higher angle relative to the hoop tow direction (circumferential direction). The main purpose of helical layer is to wind or wrap prepreg tow to cover the domes or spherical parts of pressure container. Almost all pressure containers have hoop and helical layers, but some types of pressure containers have only hoop layers. However, a composite pressure container has at least a hoop layer. Failure of pressure container in burst test initiates at hoop layer of container or is designed as the failure initiates at hoop layers or hoop state.

The failure feature of hoop strength for pressure container or tubular body can be regarded as a tensile mode in burst test, and the achieving rate of its tensile strength is an important factor to define the capability of pressure container or tubular body.

"Fiber Strength Translation" is defined as a tensile strength achieving rate how the fiber actually exhibits their tensile strength in a hoop state compared to the tensile strength evaluated in a strand tensile test. Original fiber has its inherent tensile strength, which can be measured in tensile strand test specifically based on ASTM D2343. It is called "Strand Tensile Strength" or "Delivered Tensile Strength" and is defined as $\sigma_{st}$. Its number is provided by fiber supplier or acquired by measurer based on ASTM D2343, the entire contents of which are hereby incorporated by reference.

In pressure containers or tubular bodies, reinforcing fibers which are coated and/or impregnated with resin are wound on the liner and cured. From inside the liner, hydraulic pressure is applied until the liner and composite shell bursts. The pressure at burst is called the burst pressure. The actual pressure applied on inner surface of composite shell is defined as $P_{act}$.

$$\sigma_{act} = R/t \cdot P_{act}$$

where σ is composite tensile stress at burst, R is inner radius of composite shell, and t is the thickness of the composite shell.

Actual fiber tensile strength is defined as follows:

$$\sigma_f = \sigma_{act}/V_f$$

wherein:
$\sigma_f$: fiber tensile strength at burst
Vf: Fiber Volume ratio in composite shell
Fiber Tensile Strength Translation is defined as
Tensile Strength Translation=$\sigma_f/\sigma_{st}$(%)

Further, when the SBS (Short Beam Shear) strength is lower than 8 Ksi, the transmission of stress between filaments is reduced less, and this poses a problem in the composite performance. Further when the SBS strength is lower than 8 Ksi, the stress transfer between filaments is not efficient, and the stress imbalance between filaments is extreme, which causes low tensile strength translation.

A prepreg tow having a strength of 300 Ksi or more in the NOL ring test according to ASTM D 2290 (incorporated herein by reference) is preferable for the composite pressure container or tubular body. Accordingly, a reinforcing fiber having a high strength is preferred.

Likewise, in a ring burst test, it is advisable that a fiber strength translation is at least 80%. These mechanical properties are preferable for the composite pressure container using the prepreg tow to exhibit the fiber strength translation of at least 80%.

The ring burst test used herein is established by Mitsubishi Rayon Co., Ltd. Specifically, the ring burst test is described in JP11014379, incorporated herein by reference. The test result of this method can provide a criterion how the prepreg tow can exhibit a tensile strength translation in the actual tubular body or pressure container, which includes hoop part of pressure container by applying hydraulic pressure from inside of the ring. The specimen has a cylindrical shape and the actual size is 500 mm of inner diameter, 510 mm of outer diameter and 25 mm of cylindrical length, which is machined with 0.1 mm of tolerance from longer cylinder part made by filament winding process. The specimen shall be installed in a matched metal die and from inside the specimen hydraulic pressure is applied. More concretely fluid for pressurizing is poured in a rubber-like tube locating inside of the specimen and actually the pressure is applied on the inner surface of specimen till the specimen fails or breaks. Strain gauge is attached on the outer surface of the specimen and the strain can be recorded and also the hydraulic pressure is recorded. The ring burst test exhibits a burst pressure that is close to that of actual pressure container or tubular body, and its failure is considered as tensile mode. On the other hand NOL ring test also exhibits a tensile failure mode of tubular body. The difference is the way of applying force. The ring burst test is more practical than NOL ring test for hoop strength of pressure container and tubular body, and it is more useful than NOL ring test to assess prepreg tow capability. There is no ASTM standard equivalent to ring burst test.

Other properties of the prepreg tow such as resin viscosity and resin content are preferably taken into account as they may affect the mechanical properties of the composite pressure container or tubular body in the filament winding process.

Preferably, the number of filaments in the tow count of the prepreg tow is between 500 and 300,000. If the tow count is less than 0.5K, manufacturing cost of the towpreg is very high. In addition, too many spools are needed for filament winding process, which is undesirable. If the tow count is more than 300K, tension difference between both sides of prepreg tow may be higher than the prepreg tow with smaller tow count, which may reduce tensile strength translation. The above range includes all values and subranges therebetween, including 750, 1000, 1100, 1500, 2000, 5000, 10,000, 15,000, 20,000, 25,000, 50,000, 75,000, 85,000, 95,000, 99,000, 100,000, 150,000, 200,000, 250,000, 275,000, and 295,000.

It is preferable that the resin viscosity of the prepreg tow is 10,000 to 1,000,000 cps at 75° F. When the resin viscosity is less than 10,000 cps, the resin is bled out on the surface in winding the prepreg tow on a spool. When the resin viscosity is more than 1,000,000 cps, a void is formed between prepreg tows in winding the prepreg tow on a mandrel, and this may decrease the fiber strength translation. The aforementioned resin viscosity range includes all values and subranges therebetween, including 12,000, 15,000, 25,000, 50,000, 100,000, 150,000, 500,000, 750,000, and 900,000 cps at 75° F.

It is preferable that the width of the prepreg tow is uniform. A standard deviation is adjusted to, preferably 0.01 inch or less, more preferably 0.005 inch or less. These ranges include all values and subranges therebetween, including 0.009, 0.007, 0.006, 0.004, 0.003, 0.002, and 0.001 inch or less.

When the standard deviation of the tow width is large, a gap between tows or overlapping thereof may occur to decrease the uniformity of molded articles and have an adverse effect on the fiber strength translation of the hoop fiber.

The fiber volume content of the prepreg tow is preferably 40 to 95%, more preferably 65 to 75%. These ranges include all values and subranges therebetween, including 51, 55, 57, 59, 61, 63, 67, 69, 71 and 73%. When the fiber volume content is less than 40%, a large amount of the resin is present between layers, which may have an adverse effect on the fiber strength translation. Alternatively, a large amount of the resin is bled out on the surface to deteriorate the appearance.

The term, tubular body, is generally referred to herein to mean a pipe, such as an offshore, overground, underground, or underwater pipe, a tube, transfer pipe, tank, cylindrical object, circular object, rotor, flywheel rotor and the like. The tubular body may have one or more means of attachment to an axle, turning lathe, or spindle as appropriate, or it may have a flange or connecting or sealing means on one or both ends. The term, pressure container, is generally referred to herein to mean a container used to store, preserve, carry, and/or deliver a compressed liquid, gas, other fluid, supercritical fluid, foam, powder, aerosol, and the like. The pressure container may include one or more wound fibers, resins, liners, and shells as appropriate. The pressure container may include one or more plastic, metal, and/or composite shells and/or liners or any combination thereof as appropriate. Preferably, the reinforcing fiber is wound around the liner outer shell to enhance the strength of the pressure container. The pressure container may also include one or more valves, valve attachment means, content delivery means, flanges, threads, regulators, caps, relief valves, pressure gauges, and/or connectors as appropriate in any combination.

EXAMPLES

Having generally described this invention, a further understanding can be obtained by reference to certain specific examples which are provided herein for purposes of illustration only and are not intended to be limiting unless otherwise specified.

Example 1

One mole of polyethylene glycol having a molecular weight of 7000 was reacted with one mole of diglycidyl ether bisphenol-A which was 188 g per epoxy equivalent to form a copolymer having a weight average molecular weight of approximately 8,000. One kilogram of this copolymer was mixed with 11 kg of an epoxy mixture of EPON 828, EPON 1050 and EPON 1001F of Shell at a ratio of 45/45/10, to form a resin mixture. This resin mixture was uniformly mixed with 880 g of dicyandiamide and 440 g of 3-(3,4-dichlorophenyl)-1,1-dimethylurea. The average particle diameter of dicyandiamide and 3-(3,4-dichlorophenyl)-1,1-dimethylurea was 10 μm, to form a resulting resin mixture.

The resulting resin mixture was heated at 70° C., and poured into the same amount of deionized water held at 70° C., to form a solution. The solution was stirred at 1,500 rpm. The temperature was then decreased to 35° C. to form an emulsion. The amount of the copolymer added was approximately 8%.

Example 2

A prepreg tow was produced using a prepreg tow production apparatus shown in FIG. 1 using the emulsion formed in Example 1. The emulsion was charged in a resin tank 5, maintained at 35° C., and always stirred with a stirrer. The resin emulsion was fed to a resin impregnation device through a resin feed pipe 4 with a metering pump.

A spool of 12,000 filaments of carbon fiber TR50S manufactured by Mitsubishi Rayon Company Ltd. was installed in a creel. A carbon fiber tow was fed to the resin impregnation device and brought into contact with the resin fed from the resin tank. Subsequently, the fiber was impregnated with the resin through a resin impregnation roll, and water was then dried with an oven 6. The tow was wound with a winder 7. The production rate was 15 m/min, and the resin content was 30% by weight.

Example 3

The prepreg tows produced in Example 2 were used, and they were arranged unidirectionally to form a unidirectional prepreg. Twelve plies of the prepreg were laminated, and cured in an autoclave at 275° F. for 2 hours to form a unidirectional laminate.

From the unidirectional laminate, test pieces for an interlaminar shear strength (SBS) and a 90° tensile strength (FS90) were prepared, and SBS and FS90 were measured according to ASTM D2344 and ASTM D790 (both incorporated herein by reference).

SBS and FS90 at 75° F. were 15 Ksi and 16 Ksi respectively.

Example 4

A NOL ring test piece having an inner diameter of 146 mm, a thickness of 1.50 mm and a width of 6.35 mm was prepared using the prepreg tow formed in Example 2. The curing was conducted at 257° F. for 2 hours.

The NOL ring burst test was conducted according to ASTM D2290.

A hoop tensile strength was 645 Ksi, and a fiber strength translation recorded 92.1% and the coefficient of variation was 2.3%.

Example 5

A ring burst test was likewise conducted using the prepreg tow produced in Example 2.

A Teflon ring (5 mm thick, 500 mm of outer diameter) was used as a mandrel, and a hoop was wound thereon. The product was then cured under the same curing conditions as in Example 4 to prepare a test piece, which has the same dimension as aforementioned.

A hydrostatic pressure was exerted from inside to burst the ring. At this time, a fiber tensile strength calculated was 670 Ksi. A tensile strength translation was 95.7%, and CV (Coefficient of Variation) of the burst pressure was 1.6%.

Comparative Example 1

An emulsion was produced in the same manner as in Example 2 except that the amount of the surface active copolymer formed in Example 1 was changed to 0.5% and the water content to 50% respectively. However, the emulsion stability was not good.

Instead, a resin mixture was formed as in Example 2 except that the content of the surface active copolymer was changed to 0.5%. A prepreg tow was produced using the resin mixture. The resin content was 30%.

Example 7

An emulsion was produced in the same manner as in Example 2 except that the amount of the surface active copolymer formed in Example 1 was changed to 4% and the water content to 50% respectively.

A prepreg tow was produced under the same conditions as in Example 2. The resin content was 30%.

Comparative Example 3

The same tests as in Examples 3 to 5 were conducted using the prepreg tows in Comparative Example 1 and Example 7. The results are shown in Table 1.

TABLE 1

| Prepreg tow | | | | Ring burst | | |
|---|---|---|---|---|---|---|
| Material | Content of surface active agent (%) | ILSS Ksi | FS90 Ksi | NOL ring Ksi | Strength (Ksi) | Fiber strength translation (%) |
| Ex. 2 | 8.3 | 15 | 16 | 645 | 653 | 93.3 |
| Comp. Ex. 1 | 0.5 | 9 | 10 | 553 | 560 | 80.0 |
| Ex. 7 | 4.0 | 13 | 17 | 660 | 647 | 92.4 |

Example 6

The prepreg tow in Example 2, Comparative Example 1 or Example 7 was wound on an aluminum pressure container liner having a diameter of 6.4" in the same pattern to prepare a test piece. Subsequently, a bottle burst test was performed by a method described in ASTM D2585-65, incorporated herein by reference.

The results are shown in Table 2.

TABLE 2

| Prepreg tow | | Ring burst | |
|---|---|---|---|
| Material | Content of surface active agent (%) | Strength (Ksi) | Fiber strength translation |
| Ex. 2 | 8.3 | 678 | 96.9 |
| Comp. Ex. 1 | 0.5 | 550 | 78.6 |
| Ex. 7 | 4.0 | 666 | 95.1 |

Obviously, numerous modifications and variations of the present invention are possible in light of the above teachings. It is therefore to be understood that within the scope of the appended claims, the invention may be practiced otherwise than as specifically described herein.

The invention claimed is:

1. A process for producing a prepreg tow, comprising:
   contacting at least one reinforcing fiber tow with an aqueous emulsion comprising water, a thermosetting resin and a surface active agent, to form a coated fiber; and
   vaporizing said water from said coated fiber, and
   wherein the surface active agent is a reaction product of polyethylene glycol or polypropylene glycol and an epoxy resin and has molecular weight of at least 5000 and at most 30000, and wherein an amount of the surface active agent is 4% by weight to 10% by weight of an amount of thermosetting resin.

2. The process as claimed in claim 1, wherein the water content of said emulsion is at most 90% by weight.

3. The process as claimed in claim 1, wherein the water content of said emulsion is at most 20% by weight.

4. The process as claimed in claim 1, wherein the viscosity of said emulsion in contact with the reinforcing fiber is 1 to 10,000 cps.

5. The process as claimed in claim 1, wherein the water is vaporized by heating.

6. The process as claimed in claim 1, wherein said contacting further comprises impregnating said fiber with said aqueous emulsion.

7. The process as claimed in claim 1, wherein said fiber is selected from the group consisting of carbon fiber, oxidized fiber, graphite fiber, boron fiber, glass fiber, organic fiber, and combinations thereof.

8. The process as claimed in claim 1, wherein the fiber comprises at least 500 filaments and at most 300,000 filaments.

9. The process as claimed in claim 1, wherein the fiber is twisted.

10. The process as claimed in claim 1, wherein the fiber is partially cut or is composed of cut filaments.

11. The process as claimed in claim 1, wherein the thermosetting resin is an epoxy resin.

12. The process as claimed in claim 1, wherein the aqueous emulsion comprises the surface active agent comprising a main chain which comprises at least one oxygen atom and a bisphenol skeleton, in an amount of at least 2 wt% based on a resin solid content.

13. The process as claimed in claim 12, wherein the amount is at least 5 wt% based on a resin solid content.

14. The process of claim 1, wherein the surface active agent is the reaction product of a polyethylene glycol and an epoxy resin comprising reacted units of a bis-phenol.

15. The process of claim 1, wherein the fiber volume content of the prepreg tow is from 40 to 75%.

16. The process as claimed in claim 1, wherein the surface active agent has a molecular weight of at least 10000 and at most 30000.

17. The process as claimed in claim 1, wherein the surface active agent has a number average molecular weight of at least 12000 to at most 30000.

18. The process as claimed in claim 1, wherein the prepreg tow comprises a plurality of unidirectionally oriented fibers.

19. The process as claimed in claim 18, wherein the fibers are uncut.

20. A process for producing a prepreg tow, comprising:
producing at least one reinforcing fiber tow;
contacting the reinforcing fiber tow with an aqueous emulsion comprising water, a thermosetting resin, and a surface active agent, to form a coated fiber; and
vaporizing said water from said coated fiber, and
wherein the surface active agent is a reaction product of polyethylene glycol or polypropylene glycol and an epoxy resin and has molecular weight of at least 5000 and at most 30000, and wherein an amount of the surface active agent is 4% by weight to 10% by weight of an amount of thermosetting resin.

21. The process as claimed in claim 20, wherein said fiber is selected from the group consisting of carbon fiber, oxidized fiber, graphite fiber, boron fiber, glass fiber, organic fiber, and combinations thereof.

22. The process as claimed in claim 20, wherein the fiber comprises at least 500 filaments and at most 300,000 filaments.

23. The process as claimed in claim 20, wherein the fiber is twisted.

24. The process as claimed in claim 20, wherein the fiber is partially cut or is composed of cut filaments.

25. The process as claimed in claim 20, wherein said contacting further comprises impregnating said fiber with said aqueous emulsion.

26. The process as claimed in claim 20, wherein the thermosetting resin is an epoxy resin.

27. The process as claimed in claim 20, wherein the aqueous emulsion further comprises the surface active agent comprising a main chain which comprises at least one oxygen atom and a bisphenol skeleton, in an amount of at least 2 wt% based on a resin solid content.

28. The process as claimed in claim 27, wherein the amount is at least 5 wt% based on a resin solid content.

29. The process of claim 20, wherein the fiber volume content of the prepreg tow is from 40 to 65%.

30. The process of claim 20, wherein the surface active agent is the reaction product of a polyethylene glycol and an epoxy resin comprising reacted units of a bis-phenol.

31. The process of claim 20, wherein the fiber volume content of the prepreg tow is from 40 to 75%.

32. The process as claimed in claim 20, wherein the surface active agent has a molecular weight of at least 10000 and at most 30000.

33. The process as claimed in claim 20, wherein the surface active agent has a number average molecular weight of at least 12000 to at most 30000.

34. The process as claimed in claim 20, wherein the prepreg tow comprises a plurality of unidirectionally oriented fibers.

35. The process as claimed in claim 20, wherein the fibers are uncut.

* * * * *